United States Patent [19]

Rohatgi

[11] Patent Number: 5,200,003

[45] Date of Patent: Apr. 6, 1993

[54] COPPER GRAPHITE COMPOSITE

[75] Inventor: Pradeep K. Rohatgi, Milwaukee, Wis.

[73] Assignee: Board of Regents of the University of Wisconsin System on behalf of the University of Wisconsin-Milwaukee, Milwaukee, Wis.

[21] Appl. No.: 635,711

[22] Filed: Dec. 28, 1990

[51] Int. Cl.$^5$ ............................................... B22F 1/00
[52] U.S. Cl. ...................................... 148/514; 148/553
[58] Field of Search ............... 148/514, 553, 432, 435; 420/469, 485, 492

[56] References Cited

U.S. PATENT DOCUMENTS

| | | | |
|---|---|---|---|
| 1,390,197 | 9/1921 | Dower | 148/432 |
| 1,775,159 | 9/1930 | Donaldson et al. | 148/432 |
| 2,436,205 | 2/1948 | Deitz et al. | 148/432 |
| 3,964,145 | 6/1976 | Telang | 148/432 |
| 4,207,096 | 6/1980 | Suwa et al. | 148/432 |

FOREIGN PATENT DOCUMENTS 47-44408  11/1972  Japan .................................. 420/485

*Primary Examiner*—John P. Sheehan
*Attorney, Agent, or Firm*—Irving D. Ross, Jr.

[57] ABSTRACT

A process for producing a copper alloy composite containing dispersed graphite. The process comprises locating compacted uncoated graphite in a preheated die, pouring molten copper alloy over the compacted graphite and infiltrating the compacted graphite with the molten copper alloy.

2 Claims, No Drawings

COPPER GRAPHITE COMPOSITE

FIELD OF INVENTION

This invention is directed to a composition of matter and a method to produce cast copper graphite composites by adding graphite particles to molten copper alloys.

BACKGROUND OF THE INVENTION

Copper alloys which are used extensively in plumbing products such as brass fittings generally exhibit poor machining characteristics. To improve the machinability of these alloys lead has been added to the composition.

Recently, attention has focused on the possible leaching out of lead into water resulting in a health hazard. Because of this deleterious effect of lead in potable water it has become desirable to eliminate lead from these brass products that come in contact with drinking water. In addition to the toxic contamination of water by lead the machining of these brass fittings leads to toxic waste.

Research has been conducted to produce copper graphite composites using powder metallurgy techniques to produce samples for machinability. In addition a process covered by U.S. Pat. No. 4,207,096 teaches a method of casting permitting an uniform dispersion of graphite in copper. This novel casting technique as covered by U.S. Pat. No. 4,207,096 apparently avoids the inherent difficulty in evenly dispersing graphite in a copper or another material matrix. These difficulties are due mainly to the differences in specific gravity of the dispersing material and the matrix causing float up and uneven dispersion. Another difficulty of obtaining an homogeneous composite is due to the soluble incompatibility of the two materials.

Research conducted in the field of copper graphite composites during the past fifteen years indicates mainly an effort directed to producing composites with tailored friction or expansion or damping properties.

The present invention resulted from research effort focusing on the improvement of the machinability of copper alloys through the use of a simple casting process to produce copper graphite particle composites with machinability characteristics similar to leaded copper alloys.

SUMMARY OF THE INVENTION

It is the object of the present invention to provide a method of producing cast copper graphite composite alloys having both improved machining and physical properties.

It can also be appreciated that the process can also be utilized to produce copper graphite alloys for other applications such as bearings, bushings, and electrical contacts where the solid lubricating low friction characteristics of graphite can be utilized. It can be further recognized that the process of this invention can be directed to the dispersion of particles such as molydisulphide, talc, selenides, fluorides, silicon carbide, oxides or the like.

In its simplest form the invention consists of melting a quantity of a copper based alloy in a conventional furnace and stirring in graphite particles above the liquidus temperature or at a temperature between the solidus and liquidus temperature of the copper alloy. The copper alloy-graphite particle slurry can then be poured from the crucible into the desired mold.

The resulting composite material contains graphite dispersions in the matrix of copper alloys and the dispersed graphite particles improve machinability of the copper alloys by acting as chip breakers. The alloy produced by the method of this invention has good appearance and corrosion resistance.

Variations of the above described process can be utilized to facilitate the introduction of the graphite particles in the copper alloy melt:

1) Coat the graphite particles with a metal such as nickel or copper.
2) Add titanium and or chromium to the melt.
3) Apply pressure to the surface of the melt by means of a plunger during solidification of the slurry.

When the principal object is to produce a copper alloy casting with improved machinability then the percent volume of graphite dispersed in copper matrix can be as low as 1 to 2%, or less than 5% and size of the graphite particles can range between 2 to 400 microns. As the appearance of the alloy is also important the size of graphite should be between 2 to 40 microns and its volume should be below 5 percent.

In applications where large graphite percentages above 25 percent volume are required, the invention proposes a method of packing uncoated, or copper or nickel coated graphite particles in a tube or steel die and pouring under pressure molten copper alloys onto this packed bed so the molten metal will flow into the interstices of the compacted particles thus infiltrating the bed and forming a homogeneous composite material. Upon solidification of the alloy a cast copper graphite composite alloy with a high volume percentage of graphite is produced. An alternative method to pouring under pressure would be to apply pressure to the surface of the composite melt after pouring.

The cast copper graphite particles produced using the process of this invention can subsequently be mechanically worked to produce wrought versions of these alloys. The working could use processes like rolling, forging, extrusion, or swaging. The mechanical properties of the wrought versions of the cast copper graphite alloys made using the process of this invention will have improved mechanical properties over the wrought versions of this alloy.

EXAMPLE I 5 kg of copper alloy C-903 was melted and its temperature brought to 1150° C. Nickel coated graphite particles were introduced in the alloy by stirring the particles above the liquidus temperature. Stirring was continued until the temperature of the alloy dropped below the liquidus region into semi-solid range. The alloy was permitted to solidify in the crucible itself and upon examination the cast material showed distribution of graphite particles in the cast copper alloy microstructure.

EXAMPLE II 2 kg of copper alloy C-87420 was melted and its temperature brought to 1200° C. 30 grams of titanium and 30 grams of chromium was added to the alloy melt and 70 grams of 40 micron synthetic graphite powder was stirred into the melt of this alloy. While stirring the graphite particles the temperature of the alloy was allowed to drop until the melt became viscous. Stirring was stopped and the impeller was pulled out while the slurry of copper alloy and graphite particles was allowed to solidify in the crucible.

Microscopic examination of the casting showed dispersion of graphite particles in the casting. Machining of the casting containing dispersed graphite particles showed small size chips compared to long chips generally observed during machining of the conventional C-87420 alloy. Specific milling operations were carried out with a depth of cut of 16" and the rpm of the milling cutter was 470 to 700. The other machining operations which showed a decrease in chip sizes due to dispersions were drilling and turning.

EXAMPLE III

This example relates to pressure infiltration techniques to produce high volume percent copper graphite composite particles. Copper coated graphite particles were placed in a compact form at the bottom of a steel die which was preheated to a temperature of 600° C. Molten copper alloy C-87420 at 1200° C. was poured over the compact of copper coated graphite powder and pressed into the copper coated graphite powder compact at pressure ranging from 500 to 5000 psi. The resulting pressure on the molten metal may be effected either by pouring under pressure or by applying pressure to the surface of the melt after pouring. The molten alloy infiltrated the bed of copper coated graphite powder resulting in a composite disc containing over 20 percent volume graphite dispersed in the matrix of copper alloy. Machining tests on this alloy indicated that the size of chips was considerably smaller during machining of graphite containing copper alloy.

EXAMPLE IV 4000 grams of copper alloy 903 was melted and 50 grams of titanium sponge was added to the melt. The melt temperature was brought to 1150° C. and 50 grams of 200 mesh size graphite powder preheated to a temperature of 300° C. for two hours was allowed to drop until the alloy was in the semi-solid state. The alloy was bottom poured in a steel permanent mold and the resulting casting showed distribution of graphite particles in the matrix of cast copper alloy. Bottom pouring permits direct casting into molds. The cast rod was machined into a 0.5" diameter rod which was subjected to machining tests involving turning, drilling, broaching, and threading at speeds in excess of 2000 rpm. Without any graphite the conventional alloy could not be machined, whereas the alloy with graphite dispersions could be successfully machined resulting in small chips comparable to those obtained in lead containing C-903 alloy.

The graphite containing copper alloy casting produced in this example showed adequate corrosion resistance and no increasing tendency for dezincification.

The development of the technique described in this example will permit direct casting of composite alloys into a series of molds placed on a moving belt. This technique of semi-solid casting can be integrated with continuous casting process of copper alloys and therefore can be used to make large quantities of material.

EXAMPLE V 3000 grams of C-903 copper alloy was melted and 50 grams of titanium sponge was added to 40 grams of five micron size graphite powder was preheated to 300° C. for 2 hours and stirred into the melt at temperatures starting at 1150° C. and progressively decreasing during stirring. The copper alloy graphite particle slurry was poured into a permanent mold. The permanent mold casting showed a good dispersion of 5 micron size graphite particles. When this casting was machined the chip size was comparable to the chip size obtained during machining of lead containing copper alloy. The corrosion resistance of the graphite containing copper alloy was quite similar but better than the copper alloy without any graphite particles. The surface appearance of the alloys after machining looked quite similar to the base alloy without any graphite particles dispersed in it.

To assess the desirable characteristic of ease of machinability all of the above described methods of producing copper graphite composites show a reduction in chip size and a decrease in chip strain. The measurements were made in a quantitative manner and clearly demonstrate the advantages of the machinability of these graphite containing alloys. X-ray diffraction of the chips was performed to confirm the uniform presence of graphite. Even the presence of graphite was seen in the machined chips.

DESCRIPTION OF THE PREFERRED EXEMPLARY EMBODIMENT

A cast copper graphite composite is prepared by first melting 2 kilograms of copper alloy (C-87420) and raising the temperature of the melt to 1200° C. Thirty grams each of both chromium and titanium are added to the melt as wetting agents. Seventy grams of 40 micron synthetic graphite powder is then added to the melt by stirring. While stirring in the graphite particles the temperature of the alloy is permitted to drop until the melt becomes viscous or in a semi-solid state. Stirring is then discontinued and the slurry of copper alloy and graphite particles is allowed to solidify in the mold. The copper graphite composite can now be reheated for casting into a desired mold.

I claim:

1. A process for producing a cast copper alloy composite containing evenly dispersed graphite particles comprising
   (1) Locating uncoated graphite particles in compact form at the bottom of a preheated steel die;
   (2) Pouring molten copper alloy over the compacted graphite particles at pressures from 500 to 5000 psi;
   (3) Infiltrating the compacted graphite particles resulting in a composite consisting of graphite evenly dispersed in a copper alloy matrix.

2. A process for producing a cast copper alloy composite containing evenly dispersed graphite particles comprising
   (1) Locating uncoated graphite particles in compact form at the bottom of a preheated steel die;
   (2) Pouring molten copper alloy over the compacted graphite particles at pressures from 500 to 5000 psi;
   (3) Infiltrating the compacted graphite particles by applying pressure to the surface of the poured molten alloy thereby resulting in a composite consisting of graphite evenly dispersed in a copper alloy matrix.

* * * * *